July 3, 1956 R. D. FAULKNER 2,753,073
SEAL FOR COMPOSITE CATHODE RAY TUBES
Filed Dec. 15, 1949
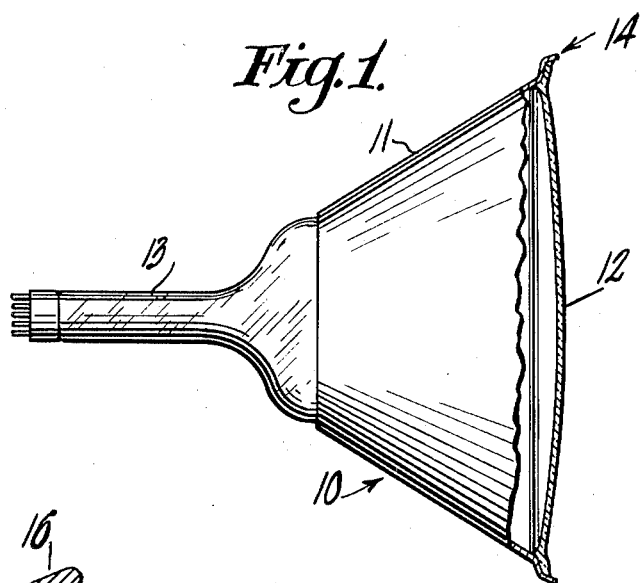
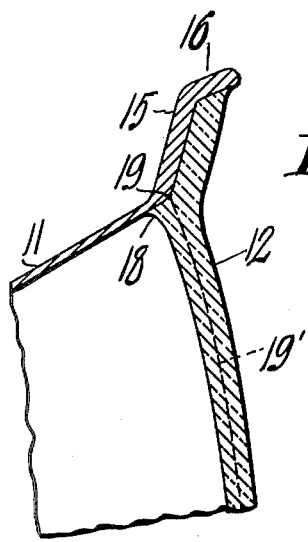
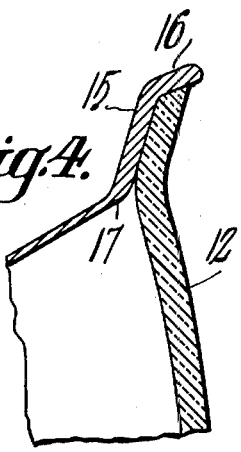
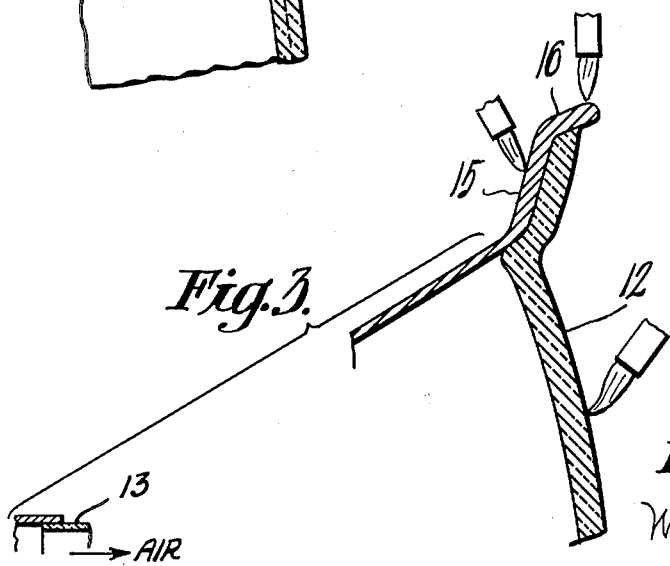
INVENTOR
Richard D. Faulkner
BY William A. Zalesak
ATTORNEY United States Patent Office 2,753,073
Patented July 3, 1956

2,753,073

SEAL FOR COMPOSITE CATHODE RAY TUBES

Richard D. Faulkner, Lancaster, Pa., assignor to Radio Corporation of America, a corporation of Delaware Application December 15, 1949, Serial No. 133,082

3 Claims. (Cl. 220—2.3)

My present invention relates to composite glass and metal cathode ray tubes of the type suitable for television receivers and having a relatively large face plate or screen disc sealed vacuumtight to the larger end of a metal member or shell which is usually though not necessarily cone shaped. More specifically my invention relates to the seal between the face plate and the metal shell of such tubes.

Ever since the advent of the first composite glass and metal cathode ray tubes considerable effort has been directed toward perfecting the sealing of the glass face plate to the metal cone, nevertheless, the percentage of such seal failures has been high and has remained a serious factor in the cost of production of such tubes. In my copending application Serial No. 120,400, filed October 8, 1949, now Patent No. 2,682,963, I have disclosed an improved metal cone having a sealing land or rim which has made possible substantial reduction in the cost of manufacturing such tubes while at the same time providing a tube which may be manufactured by high speed mass production methods and yet is less subject to seal failures than tubes previously manufactured.

In a metal cathode ray tube, the seal between the face plate and the metal shell, that is, the area adjacent the interface, in addition to being vacuumtight, must be capable of successfully withstanding tremendous stress not only when the tube has been fully processed to the state of hard vacuum therein, but also during processing and handling subsequent to the sealing of the face plate to the metal shell when equal atmospheric pressures are present on both sides of the face plate. As pointed out in said copending application, in order to avoid the danger of implosion after the tube is evacuated, the face plate on completion of the sealing the same to the metal cone is under sufficient inward radial compression to cause it to bow outwardly from its normal position thereby shortening its chord and radius of curvature. Subsequently, when the tube is evacuated the great external pressure to which the face plate is subjected tends to flatten out the face plate by forcing it to bow inwardly to a final position which is the desired one. It is apparent that these forces must be nicely balanced to attain the desired end product. Since these various forces accumulate and are effective to a maximum degree in the seal area between face plate and metal shell, the seal must be capable of withstanding first the forces brought to bear by the metal shell in the absence of a vacuum in the interior of the tube which are in a direction to cause the face plate to "pop out" on failure of the seal, and second the forces which are generated when the tube is exhausted to hard vacuum which are generally in a direction to cause the face plate to implode on failure of the seal. In view of the complex nature of the forces to which the seal is subjected both during processing of the tube and during its useful life, which forces are of great magnitude in view of the large size of the components involved and the large expanse of the face plate subjected to the pressure of the external atmosphere, seal failures during processing were customarily tolerated in the past as a necessary though undesirable incident in the manufacture of such tubes.

I have found from experiments I have conducted that the primary cause for failure of the seal between the face plate and a metal cone both during processing of such cathode ray tubes and during their useful life is the fact that while the face plate is predominantly in radial compression, a portion thereof is in tension. In the seal region, the outer or external surface of the face plate is in compression while the opposite surface which is jointed to the sealing land or flange is in tension. Failure to fully appreciate this and supply an effective solution had led to the relatively high per cent of seal failures in the past.

It is therefore a principal object of my present invention to provide a seal between the face plate and metal member of large screen composite metal and glass cathode ray tubes which has improved strength and resistance to "pop out" and implosion of the face plate.

Another object is the provision of a seal in which the critical area thereof has such forces applied thereto as a result of the shape of the seal that the radial and axial forces to which the face plate is subjected are so balanced as to provide an improved seal which is better adapted to withstand the forces applied during processing and throughout its useful life.

A more specific feature of my invention is the provision of a seal between the face plate and metal member of a composite glass and metal cathode ray tube in which the metal member is provided with a rim portion having a sealing land and the seal between the face plate and metal extends not only along the sealing land but also for an effective distance along the mantle or main body portion of the metal shell to form a fillet.

These and other objects will be apparent as the nature of my invention is more fully understood from the following description taken in conjunction with the accompanying drawing.

In carrying out my invention, I effect the seal in such manner that the glass wets and seals to not only the flange or sealing land but also a portion of the metal member adjacent the sealing land. I preferably form my seal in a manner similar to that shown and described in United States Patents Nos. 2,254,090 and 2,296,307 but permit the face plate to settle downwardly far enough to effectively wet and seal to the surface of the metal member adjacent the sealing land. I then raise or return the face plate to its desired position.

In the drawing,

Figure 1 is an elevational view partly in section of a composite glass and metal cathode ray tube embodying the face plate to metal cone seal in accordance with my invention;

Figure 2 is a fragmentary sectional view thereof on an enlarged scale showing my improved seal;

Figure 3 is a view similar to Figure 2 of an intermediate step in the forming of my seal; and Figure 4 is a corresponding view of a seal made in accordance with the practice heretofore followed.

Referring now to the drawing in detail, a composite glass and metal cathode ray tube 10 has an envelope which comprises a metal mantle 11 in the shape of a truncated cone to the large end of which is sealed a glass face plate 12 while a glass neck 13 is sealed to the other or small end of the mantle. The usual electron gun structure (not shown) is mounted in neck 13 while a fluorescent screen (not shown) is provided on the interior surface of face plate 12.

The shell or metal cone 11 is provided with a flange 14 having a large diameter sealing land 15 which is preferably frusto cone-shaped and lip 16 to which the peripheral portion of face plate 12 is sealed in accordance with well known practices as shown in Figure 4 wherein is shown the seal which has heretofore been in use in order that my present invention may be more readily clearly understood.

I have found that by sealing the glass of face plate 12 to peripheral portion 17 of metal cone 11 in addition to land 15 and lip 16, as most clearly shown in Figure 2, an improved seal as well as face plate-metal cone assembly results which is far superior to that heretofore in use. A fillet 18 integral with and forming a smooth continuation of face plate 12 is provided in such manner that the forces to which the metal cone, seal and face plate are subjected are properly distributed as will be more fully pointed out hereinbelow. In the final seal, the center line or surface 19—19' of face plate 12 remains undistorted even in the region immediately adjacent the shoulder formed between portion 17 and sealing land 15. Additional benefits are derived when the face plate is so positioned that surface 19—19' intercepts the shoulder formed between portion 17 and sealing land 15.

In the manufacture of a metal cathode ray tube, a suitable alloy for the metal shell is one containing essentially about 28 per cent chromium and about 72 per cent iron while the face plate may be any ordinary lime silica window glass. Another and less costly alloy is a 17 per cent chrome-iron alloy as disclosed in the patent application of A. Rose, Serial No. 87,405, filed April 14, 1949. The metal shell is positioned for the sealing operation with flange 14 presented upwardly and face plate 12 is centered on the cone-shaped sealing land. The assembly is subjected to preheating fires while caused to rotate about its axis. When the glass is above 250 degrees C. the sealing operation is started. The face plate seal to the sealing land is preferably made by heating the under side of land 15 to a temperature of about 1000 to 1200 degrees C. preferably close to 1200 degrees C. The glass is allowed to flow out to lip 16 covering the sealing land. Simultaneously the face plate beyond the immediate sealing area is maintained at a temperature ranging between 530 degrees C. and 630 degrees C. and preferably close to 550 degrees C., that is, a temperature just above annealing temperature of the glass so that all stresses are removed from the face plate during the sealing operation. During the formation of the seal the face plate is allowed to settle downwardly as shown in Figure 3 until portion 17 of the metal cone has been wet by the glass. The face plate is then forced back to the desired position of Figure 2 by increasing the air pressure under the face plate. As shown schematically in Figure 3 the small end of neck 13, which is open at this stage of the processing of tube 10, is connected to a source of air under pressure.

Though the precise dimensions may be varied slightly, I have found that the most satisfactory results are attained when the face plate is sealed to the top ⅛ inch of mantle portion 17 of the metal shell adjacent the shoulder 19 between metal cone 11 and sealing land 15. Fillet 18 must blend into the curvature of the face plate and for best results is accomplished within ⅜ inch of the metal.

On completion of the sealing operation the assembly is allowed to reach equilibrium at a temperature of about 525 degrees C. to 575 degrees C., preferably close to 550 degrees C. At the later temperature stress relief and temperature equilibrium is completed in the exceedingly short time of five minutes and the assembly may then be left to cool down in air at room temperature. This short annealing period is made possible by the fact that during sealing operation strains in the face plate were continuously relieved and the glass is maintained in radial compression during the cooling process.

In view of the differential shrinking which takes place while the assembly is cooled down from about 550 degrees C. to room temperature, the face plate comes under high compression. The shape of my seal insures that the forces applied to the face plate have their main component directed along the center line or plane 19—19' of the face plate, the spherical symmetry of which having been preserved. I have further found that of the various parts of the metal cone 11 in the seal region the shoulder 19 of the metal cone exerts by far the predominant force on the face plate. It is apparent from Figure 4 that in constructions heretofore made this was neither appreciated nor properly taken advantage of. On the other hand, it is apparent in Figure 2 that by the avoidance of reentrant angles in the seal region and by blending the curvature of the glass into that of the metal I have provided a seal between large glass and metal components which is inherently strong and able to withstand the forces to which it is subjected. Furthermore, by preserving the spherical curvature of the center plane of the face plate in the region adjacent the seal and forming the relatively large area fillet between the face plate and metallic member, such tension as does exist on the underside of the seal is distributed over the relatively large area of the fillet. When the face plate is positioned so that the center plane intersects sealing land 15 where it merges with metallic cone 11 that is within approximately ⅛ inch of the mid-plane of the shoulder the bending forces which would otherwise be generated by flange 14 and face plate 12 are substantially eliminated and the metallic member now exerts on the face plate predominantly pure compressive forces. Here again, residual tension on the underside of the seal is distributed over the relatively large area of the fillet.

It is, therefore, apparent that cathode ray tubes constructed in accordance with my invention have enhanced resistance to shock while the face plate-mantle assembly is not subject to seal failure and popping-out of the face plate. Though specific materials have been described as well as the preferred method of making my seal, it is apparent that changes may be made without departing from the scope of my invention as set forth in the appended claims. For example other alloys and glasses may be used and variations in the temperature at which the various steps are carried out may be made, however, I have found that my preferred temperatures provide the most satisfactory construction.

Reference is made to my copending application Serial No. 234,227 which was filed as a division hereof on June 29, 1951. While the present application includes description of methods for making certain composite glass-and-metal structures thereby adding clarity to the description of the actual structures as such, the methods are not claimed herein but rather in the above identified divisional case.

I claim:

1. A composite cathode ray tube envelope comprising, a metallic cone shaped member including at the large end thereof an outwardly extending cone shaped sealing flange and a lip, the inner surface of said cone shaped member having a shoulder formed where said sealing flange merges therewith, and a convex glass face plate sealed to said sealing flange, lip and shoulder, said shoulder intercepting the sectional portion of the face plate thickness at the periphery of the face plate thereof, a portion of said face plate also being sealed to an appreciable portion of said inner surface of said cone shaped member adjacent to said shoulder, said face plate portion extending over said shoulder along the inner surface portion of said cone-shaped member and forming a fillet sealed to face and blending smoothly into the curvature of said face plate, said glass face plate having a coefficient of expansion less than that of said metallic member.

2. A composite metal and glass envelope comprising, a hollow metallic shell member having a radial flange extending outwardly from one end thereof, the inner surface of said metallic member formed with a shoulder where said flange joins with said member, and a glass face plate sealed vacuum tight around its periphery to said flange, shoulder and an appreciable portion of the inner surface of said metallic member adjacent to said shoulder, said shoulder intercepting the sectional portion of the face plate thickness at the periphery of the face plate thereof, said glass face plate having a coefficient of expansion less than that of said metallic shell.

3. An envelope for an evacuated cathode ray tube, said envelope comprising a metal shell including a tubular wall having a large opening at one end and a smaller opening at the opposite end thereof, a flange extending outwardly from the wall of said shell at said large opening thereof and forming a shoulder between said flange and the inner surface of said shell wall, an outwardly curved plate of glass joined by a seal around its periphery across said large shell opening, said seal between said plate and shell extending over said flange and said shoulder and over an appreciable distance of the inner surface of said shell adjacent said flange, said shoulder intercepting the sectional portion of the face plate thickness at the periphery of the face plate thereof, said glass plate periphery including a fillet joined by said seal to said adjacent inner surface, the surface of said fillet blending into the curvature of said glass plate.

References Cited in the file of this patent

UNITED STATES PATENTS

| | | |
|---|---|---|
| 1,184,813 | Birdsall | May 30, 1916 |
| 1,912,919 | Rylsky | June 6, 1933 |
| 2,189,261 | Bowie | Feb. 6, 1940 |
| 2,219,573 | Fraenckel | Oct. 29, 1940 |
| 2,222,197 | Engels | Nov. 19, 1940 |
| 2,232,098 | Deichman | Feb. 18, 1941 |
| 2,254,090 | Power | Aug. 26, 1941 |
| 2,272,059 | De Margitta | Feb. 3, 1942 |
| 2,509,906 | Clark et al. | May 30, 1950 |
| 2,522,990 | Cartun | Sept. 19, 1950 |

FOREIGN PATENTS

| | | |
|---|---|---|
| 583,242 | Great Britain | Dec. 12, 1946 |